May 7, 1957 L. G. BOUGHNER 2,791,131
VEHICLE DRIVE MECHANISM
Filed Dec. 31, 1953 4 Sheets-Sheet 1

INVENTOR
LAWRENCE G. BOUGHNER
BY Strauch, Nolan & Diggins
ATTORNEYS

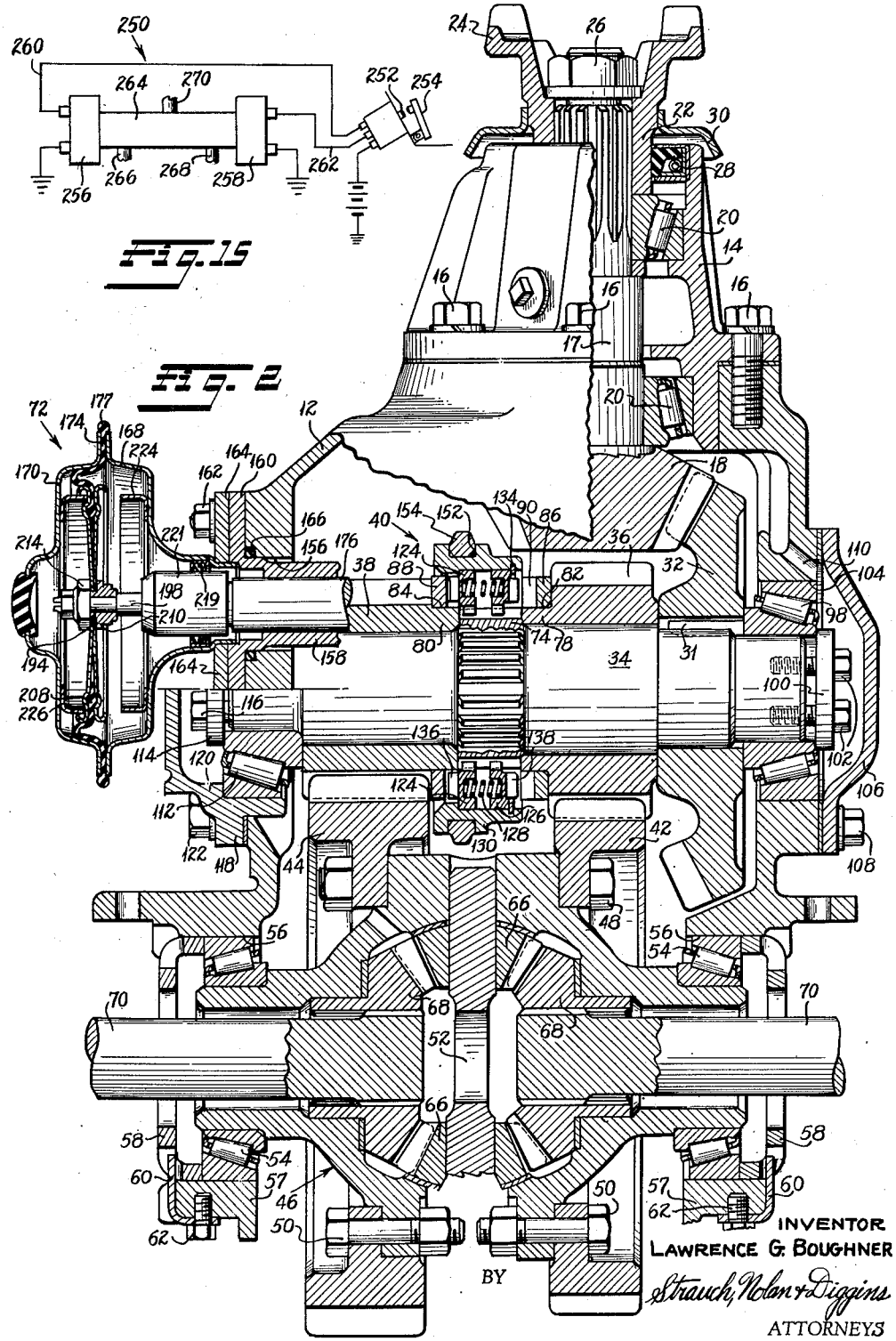

May 7, 1957  L. G. BOUGHNER  2,791,131
VEHICLE DRIVE MECHANISM
Filed Dec. 31, 1953  4 Sheets-Sheet 3
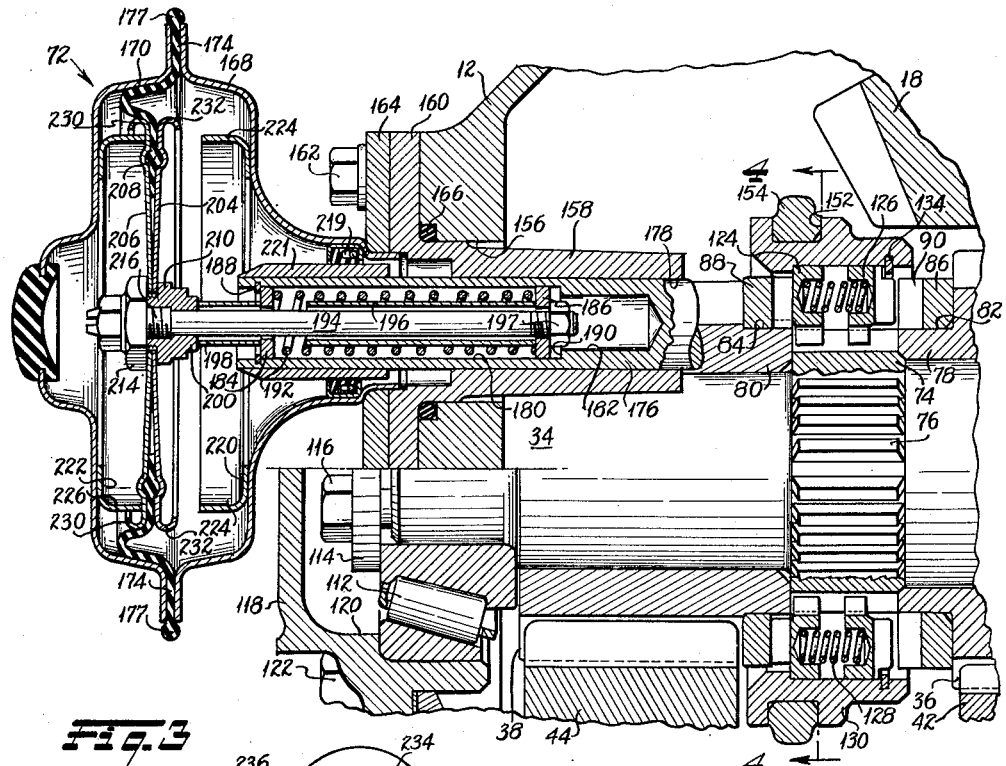
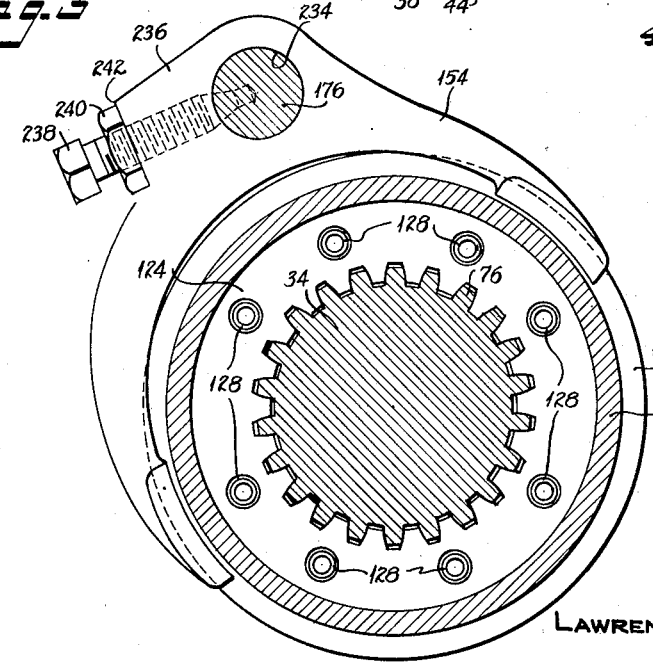
INVENTOR
LAWRENCE G. BOUGHNER
BY *Strauch, Nolan & Diggins*
ATTORNEYS

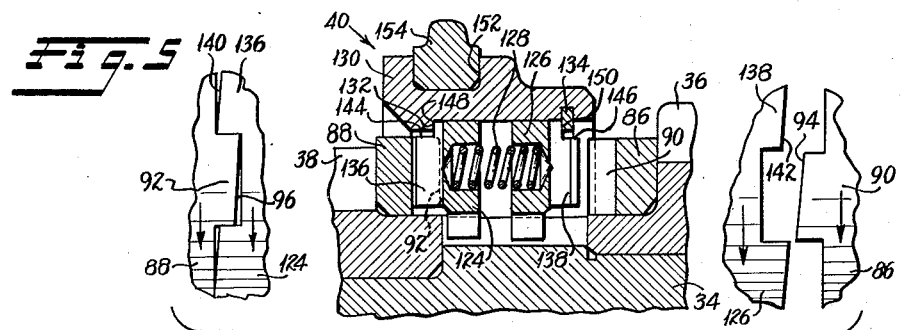
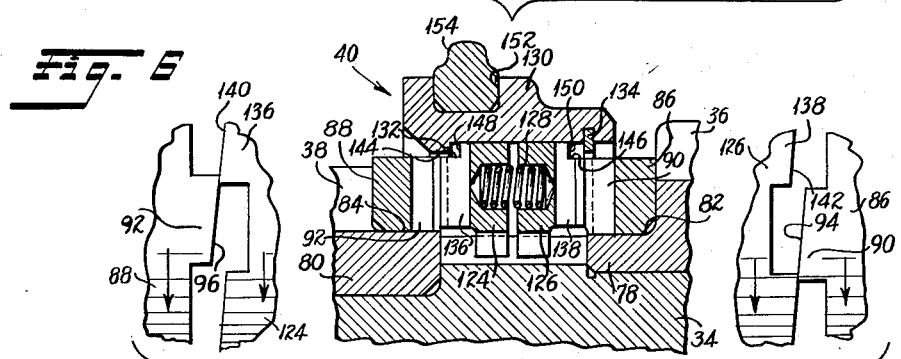
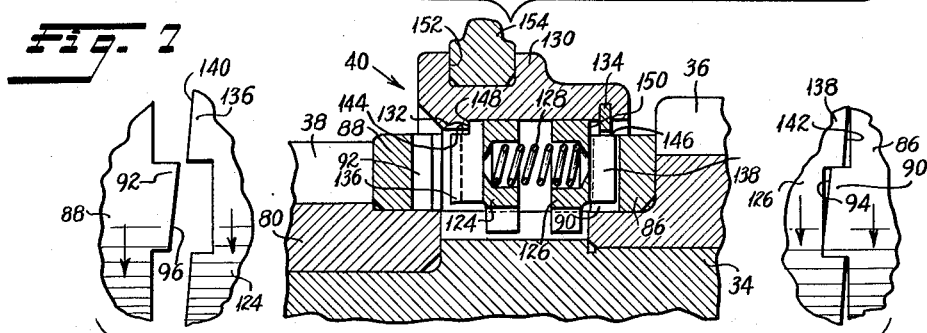
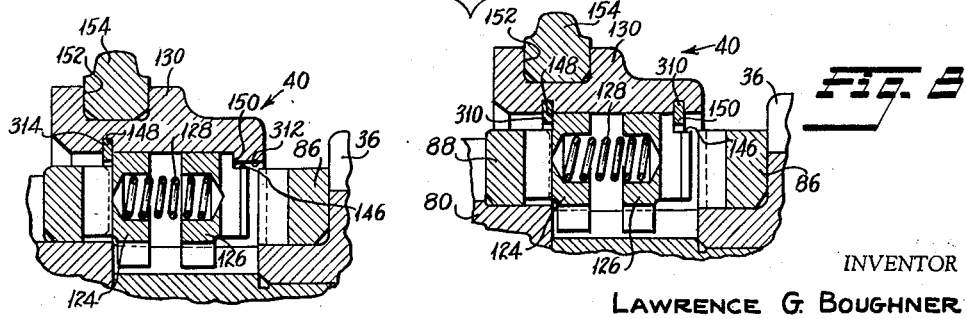

United States Patent Office 2,791,131
Patented May 7, 1957

2,791,131

VEHICLE DRIVE MECHANISM

Lawrence G. Boughner, Detroit, Mich., assignor to Rockwell Spring and Axle Company, Coraopolis, Pa., a corporation of Pennsylvania Application December 31, 1953, Serial No. 401,584

5 Claims. (Cl. 74—701)

This invention relates to improvements in vehicle drive mechanisms and more particularly to improvements in selectively shiftable multi-speed drives axles.

Multi-speed vehicle drive axles of the type disclosed by United States Letters Patent 2,480,836, issued to L. R. Buckendale, and 2,521,730, issued to B. W. Keese, represent a considerable advance in vehicle drive mechanisms by providing means for increasing the drive ratios of the vehicle without the necessity of declutching the conventional vehicle transmission. As a result vehicles equipped with such multi-speed drive axles can, without the necessity of the aforementioned declutching, be driven at relatively slow speeds, for greater tractive ability, or at a higher speed under normal road conditions, for greater fuel economy.

It has been the constant efforts of those skilled in the art to attain improved operating efficiency from such drive axles while still maintaining the size and manufacturing costs of such drive axles at a minimum.

The present invention embodies certain improved details of construction and operation over the Buckendale and Keese patents which result in a drive axle that is easily and smoothly shiftable to the various drive conditions available with a high degree of response to shifting operations and which is compact and of light weight, and wherein the drive mechanism has minimum overhang with respect to the axle housing and is easily adaptable to known multi-speed drive axles with a minimum of expense in the manufacture and conversion of vehicle drives.

Among the recent improvements in vehicle drive mechanisms and particularly in multiple speed drive axles is the development of an improved type of clutch mechanism for selectively connecting alternatively operative drive trains for operation.

The type of clutch mechanism to which reference is made is that improved type in which a pair of opposed toothed clutch members are provided with complementary axially extending teeth terminating in ratcheting end faces to permit free unidirectional rotation between the clutch members prior to synchronization of their speeds of rotation and positive drive engagement upon synchronization and which is disclosed in United States application for Letters Patent No. 330,441, for Vehicle Drive Mechanism, filed on January 9, 1953, by C. E. Schou.

Among the primary objects of this invention is to adapt clutch mechanisms of this type for shift rail mounted shift fork actuation under control of a selectively actuated fluid motor and particularly to adapt such a clutch actuated in this manner for controlling the speed selection of a two speed double reduction axle.

It is therefore a major object of this invention to provide an improved shiftable two speed double reduction vehicle drive axle that is inexpensively manufactured, light weight and compact.

Yet another object of the invention is to provide in a two speed double reduction drive axle improved mountings for the driven clutch members associated with a selectively shiftable clutch assembly to result in a more compact less expensive clutch mechanism for effecting the selection of the two available speeds.

It is a further object of this invention to provide in a two speed double reduction drive axle a clutch unit for effecting speed selection embodying a pair of relatively rotatable members disposed on either side of a shiftable clutch assembly with individually formed clutch members for cooperation with the clutch assembly which are mounted on the rotatable members in an improved manner to provide a compact selectively shiftable vehicle drive axle.

Still another object of this invention is to provide in a two speed double reduction drive axle, a clutch unit for effecting speed selection embodying a pair of opposed clutch rings having axially facing clutch teeth press fitted on axially spaced rotatable gears disposed on opposite sides of a selectively shiftable complementary clutch assembly to provide an axially compact clutch mechanism.

It is a further object of this invention to provide an improved shiftable multi-speed drive axle for vehicles with power actuating means for effecting selective shifting movements of a light resiliently mounted clutch collar.

Still another object of this invention is to provide an improved multi-speed drive axle with an energy storing device operatively associated with a resiliently mounted clutch collar to effect powered disengagement of the collar from one driving condition and operative upon resilient engagement of the collar in another drive condition to assure full engagement of the collar in the other drive condition.

An additional object of the invention is to provide a power actuating mechanism for effecting selective movement of a light clutch collar with improved means for controlling the amount of movement of said actuating mechanism and clutch collar.

These and other objects will become apparent from the following description and appended claims when read in connection with the attached drawing, wherein:

Figure 2 is an irregular horizontal sectional view for the most part taken along the line 2—2 of Figure 1;

Figure 3 is an enlarged fragmentary section of the clutch and shift mechanism shown in Figure 2;

Figure 4 is a section taken substantially on the line 4—4 of Figure 3.

Figures 5 through 7 are partial sections with associated diagrammatic views showing the sequence of movement of the improved clutch assembly;

Figure 8 is a partial section of the clutch assembly showing a further embodiment of the mounting of the clutch collars;

Figure 9 is a section similar to Figure 8 showing still a further embodiment of the clutch collar mounting;

Figure 15 is a diagrammatic view of an automatic control means for the diaphragm type actuator of this invention.

Figure 1:
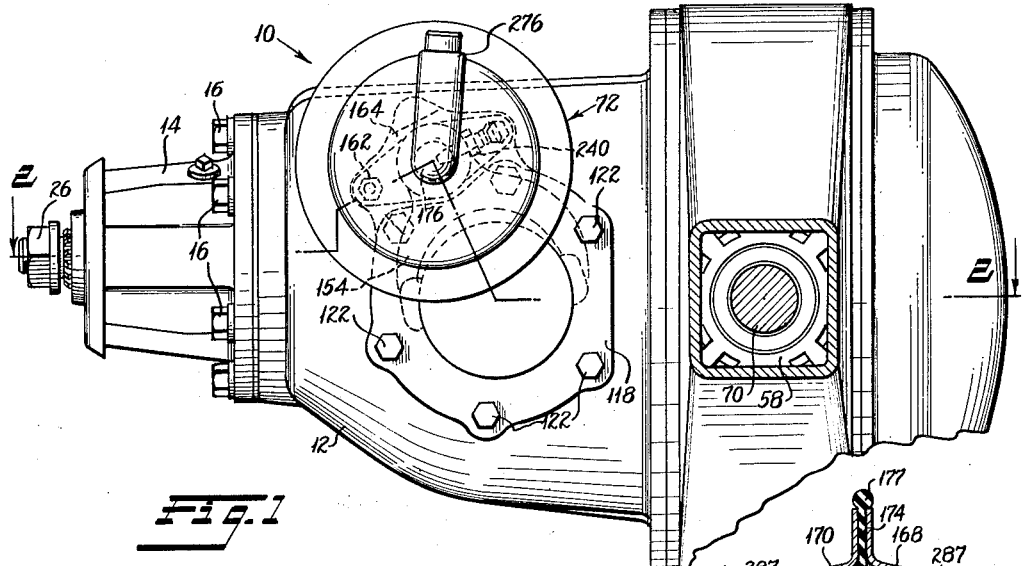
Figure 1 is a side elevational view of a preferred embodiment of the invention.

Referring now to the drawing and particularly to Figures 1 to 3 there is shown a multi-speed drive axle 10 embodying the principles of the present invention. Drive axle 10 comprises differential and reduction gear carrier housing 12 at the forward portion of which a hollow bearing cage 14 is fixed by bolts 16. As best seen in Figure 2 an engine driven shaft 17, having a bevel or hypoid input pinion 18 formed integral therewith, is rotatably supported in bearing cage 14 on spaced opposed tapered roller bearings 20 and is externally splined at its forward or outer end to receive the internally splined hub 22 of flange coupling 24. Flange coupling 24, which is a conventional coupling for connection to the usual engine driven propeller shaft (not shown), is retained on shaft 17 by nut 26 threadedly mounted at the outermost end of shaft 17. Seal 28, mounted between the outer periphery of hub 22 and an adjacent inner periphery of bearing cage 14, is protected from foreign matter by dished baffle 30 press fitted mounted on hub 22 with its concave face overlying the exposed end of seal 28 and bearing cage 14, as shown in Figure 2.

Driving torque from input pinion 18 is transmitted to bevel or hypoid ring gear 32, in constant mesh therewith, keyed as at 31 or otherwise drivingly connected to cross shaft 34 rotatably mounted in carrier housing 12. High and low speed drive gears 36 and 38, respectively, each freely rotatably mounted on shaft 34, are selectively operatively drivingly connected to shaft 34 by means of an intermediate selectively shiftable clutch assembly, generally indicated at 40, the details of which will hereinafter be more fully described. High and low speed driven gears 42 and 44, in constant mesh with gears 36 and 38 respectively, are fixed to a conventional two piece differential cage 46 by a plurality of peripherally disposed bolts 48 passing through both gears and cage 46 and a plurality of shorter bolts 50 passing through but a portion of the carrier housing and one of the gears, as shown in Figure 2. Differential cage 46 is rotatably mounted on spaced tapered roller bearings 54 conventionally mounted in bores 56 formed by semi-cylindrical recesses on legs of carrier housing 12, and coacting removable bearing caps 57 likewise formed with semi-cylindrical recesses. Roller bearings 54, whose inner races abut adjacent faces of cage 46, have their outer races retained in their respective bores by nuts 58 threaded into bores 56 and held in bearing retaining position by lock washers 60 fixed to the bearing caps 57 by screws 62.

Upon each of the equiangularly spaced arms of the differential spider 52, fixed between the mating portions of the two-piece differential cage 46, is rotatably mounted a differential bevel pinion 66 in constant mesh with the opposed differential bevel side gears 68, journalled in cage 46 and splined to the inner ends of axle shafts 70 in the conventional manner.

In general operation, rotation of pinion 18 is imparted to drive ring gear 32, cross shaft 34, and shiftable clutch assembly 40. Shiftable clutch assembly 40 is selectively movable, as will be hereinafter described, to drivingly connect either gear 36 or gear 38 to shaft 34 so that rotation of the shaft is imparted to the connected gear and its associated gear on differential cage 46. Driving rotation of gear 38 by shaft 34 imparts relatively low speed rotation to cage 46 through gear 44, while driving rotation of gear 36 from shaft 34 imparts relatively high speed rotation to cage 46 through gear 42, which latter rotation is imparted to the vehicle axle shafts 70 by the conventional differential mechanism in the well known manner.

Selective shifting movements of clutch assembly 40 are imparted to the clutch assembly by an actuator assembly generally designated 72 mounted at one side of differential carrier 12 slightly above and forwardly of the axis of shaft 34, as shown in Figure 1. The details of actuator 72 will now be particularly described in conjunction with the improved clutch assembly 40.

Shaft 34 is provided with intermediate integral raised land 74, having splines 76 formed on the periphery thereof. Gears 36 and 38 freely rotatably mounted on shaft 34, as heretofore described, are provided with integral axially extending hubs 78 and 80 respectively, the ends of which abut in bearing contact the opposite sides of land 74. Hubs 78 and 80, which axially space the teeth of the respective gears from land 74, are of the same external diameter and press fittedly receive on their peripheral surfaces 82 and 84, respectively, similar clutch rings 86 and 88, axially coextensive with their respective bosses. As shown in Figure 2, one face of each clutch ring abuts an adjacent end of the respective gear teeth. The engaged faces of the hubs and clutch rings can be suitably serrated or splined to assure a non-rotatable mounting of the clutch rings with respect to the gears.

As better known in Figure 5 the adjacent ends of clutch rings 86 and 88 are provided with face type axially extending clutch teeth 90 and 92, respectively, having inclined ends or faces 94 and 96, respectively, in the manner of the well known Maybach teeth more fully described in United States Letters Patent 2,049,126 and 2,049,127 to which reference is made for further details.

The foregoing described press fitted assembled relation of clutch rings 86 and 88 on their respective gears is of extreme importance in that a more simple, inexpensive to manufacture and compact assembly results. Gears 36 and 38 can be individually manufactured by hobbing and subsequently assembled with clutch rings 86 and 88 individually manufactured on a gear generator. When the gear and clutch ring are integral, the gear must be formed on a gear generator rather than by the less expensive hobbing operation. Additionally it will be appreciated from the foregoing described structure wherein the clutch rings, having axially extending teeth, are press fittedly mounted on gears 36 and 38 that the overall axial length of each gear and clutch ring assembly is less than gears formed with an integral spline type clutch ring such as those shown in United States Letters Patent 2,605,749, issued to L. R. Buckendale, where there must be an axial relief or separation between the spline teeth and the main gear member. As a result of this more compact axial relationship of the assembled gears and clutch rings the overall axial length of the clutch assembly is much smaller, more compact and of less complexity than devices heretofore known in the art. Of further note is the fact that clutch rings 86 and 88 are structurally identical and can be interchangeably press fitted on gears 36 and 38, since the diameters of hubs 82 and 84 are identical.

As clearly shown in Figure 2, hub 78 of gear 36 is retained in abutting relation with the adjacent side of land 74 by the hub of ring gear 32 which abuts the opposite end of gear 36 and is retained thereagainst by the inner race of tapered roller bearing 98 which is held on shaft 34 by means of headed screws 102 passing through retaining plate 100 and threadedly engaging the adjacent end of shaft 34. The outer race of bearing 98 is received in bore 104 of carrier housing 12. Cover member 106 overlying the right hand end of shaft 34 is secured to the side of carrier housing 12 as by bolts 108. Passage 110 in the wall of carrier housing 12 connecting the inner portion of carrier housing 12 with the external side of bearing 98 permits the free flow of lubrication to the bearing and the outer end of shaft 34. Bearing 112 on the left hand end of shaft 34 has its inner race in abutting contact with an adjacent end of gear 38 and is similarly retained on shaft 32 in abutting relation with gear 38 by plate 114 abutting the opposite face of the inner race of bearing 112 and held thereagainst by screws 116 threadedly passing through plate 114 and engaging the end of shaft 34. Annular cage 118 having integral internal shoulder 120 abutting with the outer race of bearing 112 is held in assembled relation on carrier housing 12 by a plurality of bolts 122.

Turning now to Figures 2 through 7, clutch assembly 40 comprises a pair of internally splined and externally smooth clutch rings 124 and 126 axially slidably mounted on splines 76 of land 74. Clutch rings 124 and 126 have on their adjacent faces a plurality of axially aligned circumferentially spaced shallow bores retaining the opposite ends of coil springs 128. Springs 128 exert an axially separating biasing force on clutch rings 124 and 126. Clutch collar 130 surrounds and is slidably mounted on the cylindrical peripheries of clutch rings 124 and 126 and by means of integral internal shoulder 132 abutting ring 124 and internally mounted snap ring 134 abutting ring 126, retains the rings therein against the biasing force of springs 128.

Clutch rings 124 and 126 are each provided on their outer faces with an annular row of axially extending face type clutch teeth 136 and 138, respectively. The teeth 136 and 138 have flat inclined end faces 140 and 142, respectively, in the manner of the heretofore described Maybach type teeth. Clutch teeth 136 and 138 are suitably cut away as at 144 and 146, respectively, to permit abutting contact of shoulder 132 and snap ring 134 with flat faces 148 and 150, respectively. As is shown in Figures 2, 3, and 5 through 7, the combined or overall axial length of clutch rings 124 and 126 between faces 148 and 150 is less than the axial distance between the adjacent opposed faces of shoulder 132 and snap ring 134, for a purpose which will hereinafter become apparent.

The outer periphery of clutch collar 130 is provided with peripheral groove 152 for slidably rotatably receiving shift fork 154 which is controlled to impart selective shifting movements to the clutch assembly 40 by actuator 72.

Turning now to Figures 2 and 3, the details of the fluid motor powered actuator 72, which imparts selective movements to clutch assembly 40, will now be described. Differential carrier housing 12 is provided with bore 156 having an axis parallel to the axis of shaft 34 for mounting hollow axially extending sleeve 158 of support flange member 160. Support flange 160 is fixed to the side of carrier housing 12 by bolts 162 which also serve to fix mounting plate 164 to carrier housing 12. Resilient seal 166, mounted intermediate flange 160 and housing 12, forms a fluid tight joint therebetween. Dished sheet metal housing half 168 of fluid motor 72 is fixed in annular mounting plate 164 by suitable means (not shown) and is fixedly secured to housing half 170 by suitable means (not shown) to clamp a resilient diaphragm 174 therebetween.

The peripheral bead 177 of diaphragm 174 disposed exteriorly of the outer peripheral edges of housing members 168 and 170 prevents inward slippage and deformation of diaphragm 174.

A shift rod 176, which is slidably mounted in bore 178 of support sleeve 158, is provided with coaxial bores 180 and 182, as shown in Figure 3. Spaced washers 184 and 186 are slidably mounted in bore 180 and are biased into normal abutting contact with internally mounted snap ring 188 and internal shoulder 190, respectively, by intermediately mounted coil compression spring 192. Washers 184 and 186 slidably mount rod 194 in axially aligned openings of the washers. As shown in Figure 3, coil spring 192 is concentric with rod 194 and intermediately disposed compression limit tube 196 whose axial length is less than the uncompressed length of spring 192, for a purpose to be explained. The right hand end of rod 194, as viewed in Figure 3, is threaded to receive nut 197 which abuts and retains washer 186 on rod 194.

Sleeve 198 is concentrically mounted on rod 194 in abutting contact at one end with washer 184 and at the other end with diaphragm pan clamping bolt 200. Sheet metal diaphragm support pans 204 and 206, which are provided with mating annular grooves for clamping the opposite sides of beaded portion 208 of diaphragm 174, are fixed between flange 210 of bolt 200 and a nut 214. The assembled flange member 210 and nut 214 are fixed on threaded portion 216 of rod 194.

Seal 219 operatively disposed between the outer periphery of sleeve 221 press fitted or brazed on sleeve 176 and an inner periphery of housing 168, as shown in Figure 3, prevents leakage therepast.

A pair of annular dished stop members 220 and 222, which are rigidly mounted with their flat faces in contacting relation with adjacent inner walls of housing members 168 and 170, respectively, as by spot welding, have peripheral flange portions 224 and 226, respectively, extending a short axial distance towards one another on opposite sides of diaphragm pans 204 and 206. The ends of flanges 224 and 226 engage the adjacent faces of pans 204 and 206, in their axially displaced positions, to act as stop members, one position being illustrated by Figure 3 wherein flange 226 is engaging the inner face of pan 206 just radially inwardly from arcuate peripheral portion 230 of pan 206.

The right hand portion of rod 176 is closely fitted within bore 234 of enlarged boss 236 of shift fork 154 (Figure 4) and is retained therein by transverse screw 238 threadedly mounted in boss 236 and engaging a conically shaped partial bore in the side of shift fork 154. Lock nut 240 threadedly mounted on screw 238 engages face 242 of boss 236 to securely lock screw 238 in its assembled position.

Turning now to Figure 15, an automatic control 250 comprises an electrical switch 252 located beneath and actuated by the usual pivoted carburetor connected accelerator pedal 254 of a vehicle. Solenoids 256 and 258 suitably connected to the switch by electrical leads 260 and 262, respectively, are also suitably mechanically connected to opposite ends of selector valve 264 to selectively position the valve for operation. Switch 252 is of such type that successive actuations of the switch will successively actuate one or the other of the solenoids to selectively connect valve 264 to either fluid conduits 266 or 268 which connect opposite sides of resilient diaphragm 174 to conduit 270 connected to valve 264 from the engine intake manifold. Conduit 266 of selector valve 264 is connected to fluid fitting 276 on the left hand side of diaphragm actuating housing 72 and conduit 268 is connected to a similar fluid connection (not shown) on the opposite side of diaphragm housing 72. Selective depressions of switch 252 will properly position valve 264 to connect the engine manifold to the desired side of the resilient diaphragm to create a vacuum on that side of the diaphragm to move the diaphragm. A spring loaded detent (not shown) acting on the plunger of switch 252 provides a controlled resistance opposing depression of the switch so that a force on pedal 254 greater than that required for full throttle engine operation is required to actuate the switch.

Figure 10:
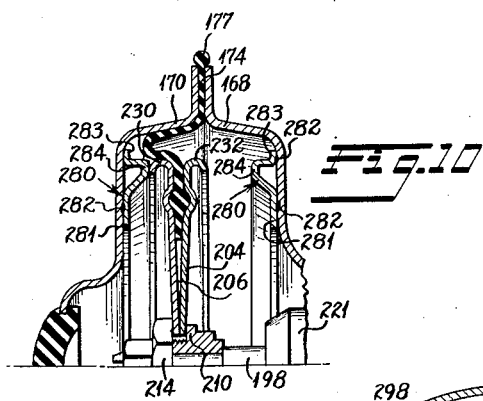
Figure 10 through 14 are sections through the diaphragm actuator showing further embodiments of diaphragm limit means.

Figures 10 through 14 show further embodiments of the diaphragm stop members. In Figure 10, diaphragm stops 280 comprise annular rings having inner and outer peripheral flanges 281 and 283, respectively, fixed to the inner adjacent walls of diaphragm housing halves 168 and 170 as by spot welds 282. Intermediate flanges 281 and 283 annular rings 280 are formed as by stamping with peripherally inwardly extending shoulders 284 formed in members 280. Annular shoulders 284 extend inwardly a short axial distance towards diaphragm 174 and are in direct alignment with peripheral inwardly bent portions 230 and 232 of diaphragm support pans 204 and 206. Shoulders 284 abut peripherally bent portions 230 and 232 of the diaphragm support pans upon rightward and leftward movement of diaphragm 174 to limit movement of the diaphragm and shift tube 176.

Figure 11:
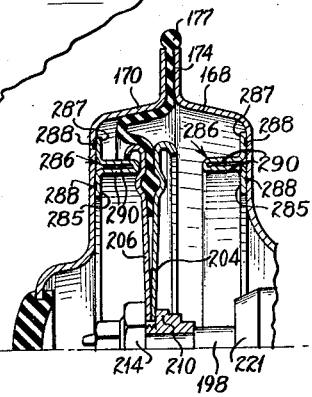

As illustrated in Figure 11, the stops comprise similar sheet metal members 286 having inner and outer peripheral flanges 285 and 287, respectively, spot welded to the inner faces of housing halves 168 and 170 as at 288. Intermediate the spot welded flanges 285 and 287, members 286 are formed with an integral annular axially inwardly extending shoulder 290 adapted to abut the adjacent faces of diaphragm support pans 204 and 206 radially inwardly of portions 230 and 232. Figure 11 illustrates the limit of extreme leftward movement of diaphargm 174 as defined by the abutment of pan 206 with projection 290.

Figure 13:
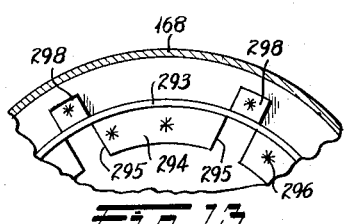
Figure 12:
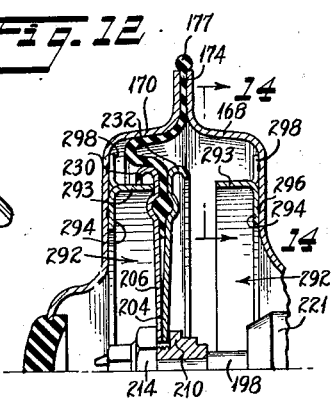

In the embodiment of Figure 12, annular stop members 292, comprise a flat radially extending portion 294 spot welded as at 296 to the adjacent inner wall of housing members 168 and 170. Axially extending flanges 293 are adapted to abut pans 204 and 206 radially inwardly of portions 230 and 232. As shown in Figure 13, portion 294 is slit as at 295 to permit tabs 298 to be bent radially outwardly and spot welded to adjacent inner walls of housings 168 and 170 to provide additional support for stop member 292. Stop members 292 function in the same manner as stop members 220 and 222 heretofore described in connection with Figures 1, 2 and 3.

Figure 14:
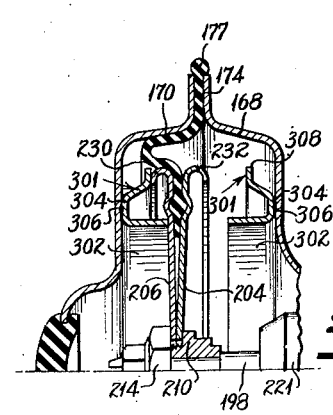

Figure 14 shows a further embodiment of the stop members wherein the stop members 301 are of a resilient nature to permit a resilient limiting of the movement of diaphragm 174. In this embodiment, each stop member 301 is formed with an axially inwardly extending annular ring 302, and an integral flat face portion 304 spot welded as at 306 to the adjacent inner wall of housing members 168 and 170. Annular rings 302 are located inwardly of portions 230 and 232 of the diaphragm support pans. Radially outwardly of flat face 304 and spaced axially inward from the adjacent inner wall of the housing members, stop members 301 are provided with flat radial flanges 308 in axial alignment with peripherally bent portions 230 and 232 of diaphragm support pans 206 and 204 respectively. In this embodiment, peripherally bent portions 230 and 232 of the diaphragm support members abut resiliently supported flanges 308 initially to decelerate the diaphragm; prior to abutment with adjacent ends of fixed annular ring 302.

Figures 8 and 9 show further embodiments for the mounting of the clutch rings of clutch assembly 40. In Figure 8, clutch rings 124 and 126 are retained against the biasing force of springs 128 by a pair of axially spaced snap rings 310. The snap ring mounted in abutting engagement with clutch ring 124 supplants integral internal shoulder 132, illustrated in the embodiment of Figures 1 to 7.

Figure 9 shows an embodiment of the clutch rings mounting wherein the right hand end of clutch collar 130 is provided with integral internal shoulder 312 adapted to abut radial surface 150 of clutch ring 126, and a snap ring 314 mounted internally of the left hand end of collar 130 in axially spaced relation to shoulder 312 is adapted to abut radial surface 148 of clutch ring 124.

The operation of the preferred embodiment will be explained after a brief description of the low and high speed-drives and means for actuating the clutch assembly.

Driving torque from the vehicle engine is transmitted through input pinion 18 and drive gear 32 to cross shaft 34. With clutch assembly 40 shifted to right, as viewed in Figure 2, gear 36 is connected through clutch 40 to shaft 34 for rotation therewith. Rotation of gear 36 is imparted to gear 42 and differential cage 46 from whence it is differentially transmitted to axle shafts 70. This is the high speed-drive condition of the axle defined by drive train 18, 32, 36 and 42. Conversely, with clutch 40 connected to gear 38 the low speed drive condition defined by drive train 18, 32, 38 and 44 is established.

Referring now to Figures 3 and 5 through 7, the actuation and operation of clutch assembly 40 in shifting from low speed drive of Figure 5 to the high speed drive of Figure 7 will now be described.

Accelerator pedal 254 is depressed sufficiently to actuate switch 252 to energize solenoid 258 to position selector valve 264 to connect conduit 270, connected to the engine intake manifold, through conduit 268 to the right hand side of the diaphragm of fluid motor 72. As vacuum is created on the right hand side of diaphragm 174, the pressure on the left hand side of the diaphragm forces diaphragm 174 toward the right. Movement of diaphragm 174 to the right is transmitted through diaphragm pans 204 and 206 to rod 194 and sleeve 198. Initial rightward movement of the diaphragm causes sleeve 198 to abut washer 184 and shift washer 184, spring 192, and washer 186 to the right until washer 186 abuts integral shoulder 190 of shift tube 176. Further rightward movement of diaphragm 174 causes rightward movement of washer 184 under the influence of sleeve 198. Washer 184 continues to move to the right compressing spring 192 until it abuts the adjacent end of compression limit tube 196. At that time there is a direct thrust connection between the diaphragm and shift rod 176 but further movement of these parts is prevented until the accelerator pedal is released to relieve the engaging force between the teeth of clutch rings 88 and 124. Upon release of the accelerator pedal continued power movement of diaphragm 174 to the right as viewed in Figure 3 is positively transmitted to shift rod 176 and collar 130 to effect positive disengagement of clutch collar 124, by virtue of the abutting engagement of ring 124 with shoulder 132 of collar 130. Powered movement to the right of diaphragm 174 and collar 130 continues until diaphragm pan 204 abuts the adjacent ends of stop flanges 224. While in this position, collar 130 slows down gradually but is still rotating faster than gear 36. At that time, collar 130 has moved to a position in which its shoulder 132 holds ring 124 in an axial position such that the short ends of teeth 136 on ring 124 just clear the short ends of the teeth 92 on ring 88 and such that the tips of the teeth 138 on ring 126 engage the tips of teeth 96 on ring 86. Collar 130 is biased to the right by compressed spring 192.

So long as this differential in rotational speeds between clutch collar 130 and gears 36 and 38 exists, clutch teeth 138 and 90 and clutch teeth 136 and 92 will ratchet past one another as permitted by the resilient backing by springs 128. Upon synchronization of clutch ring 126 and gear 36, ring 126 is resiliently moved into engagement with gear 36 and abutment with snap ring 134 under the biasing force of coil springs 128 and clutch collar 130 moves further to the right under the uncocking influence of compression spring 192 to a position in which the high points of teeth 136 clear the high points of teeth 92. In this position, which is the position illustrated in Figure 7, there is established the high speed drive condition from pinion 18 to axles 70. Depression of the accelerator pedal reestablishes the drive torque.

It readily will be seen from the foregoing that initial disengagement of clutch collar 124 and gear 38 is positively effected through power movement of diaphragm 174 and that engagement of clutch collar 126 and gear 36 is effected through the resilient action of springs 128 and spring 192 thereby assuring the proper engaging and disengaging forces being applied to these members to prevent any damage to the various components and clutch teeth of these elements.

Shifting movements from the high speed drive condition illustrated in Figure 7 to the low speed drive condition illustrated in Figure 5 is effected in essentially the same manner as that just described. The operator depresses accelerator pedal 254 which actuates switch 252 and solenoid 256 to position selector valve 264 in such a manner to connect the engine intake manifold through conduit 270 and 266 to fluid fitting 276, on the leftside of diaphragm of fluid motor 72, which results in leftward movement of diaphragm 174, which is the converse of the operating movements of the associated members heretofore described in going to the right or to high speed. However, it should be noted that, in shifting from high speed drive of Figure 7 to low speed drive of Figure 5, clutch assembly 40 upon disengagement from gear 36 is rotating at a slower speed than gear 38 and must therefore be accelerated before driving engagement between clutch rings 124 and 88 can be effected. Once clutch assembly 40 has passed into the transition stage in the manner heretofore described, the operator depresses the accelerator pedal 254 to accelerate shaft 34 and clutch assembly 40 without actuating switch 252. When clutch assembly 40 becomes synchronized with gear 38, clutch ring 124, under the resilient influence of springs 128 and spring 192, engages clutch ring 88.

It should be noted at this point that there is no neutral position for clutch rings 124 and 126, in non-engaged relation with their respective clutch rings 86 and 88, and that the position illustrated in Figure 6 is merely a transition position from toothed driving engagement of one clutch ring with its respective gear to toothed driving engagement between the other clutch ring and its associated gear. This transition state between one drive condition and the other permits a much higher degree of response to shifting operations than heretofore possible in prior art devices, and assures complete operator control of the vehicle under all vehicle operating conditions.

Clutch collar assembly 40 and shaft 34 are prevented from overspeeding at any time that the operator should inadvertently accelerate the engine while the clutch assembly 40 is in the transition state during a shifting movement from low to high speed by slipping automatically back to low. This is because, in the transition state when the teeth are ratcheting past one another, if the vehicle is accelerated, clutch ring 124 and gear 38 become synchronized and there will be a partial engagement of teeth 136 and 92 under the influence of springs 128. Engagement of teeth 136 and 92 is only partial; that is, between the high points of these teeth since clutch collar 130 has substantially withdrawn teeth 136 from engagement with teeth 92 to permit the aforementioned ratcheting and only limited movement of ring 124 to low, is possible. If, however, the accelerator pedal is depressed sufficiently to reactuate switch 252, as well as accelerate the engine, teeth 136 of clutch collar 124 and teeth 92 will fully engage, as illustrated in Figure 5. It will thus be seen that inadvertent acceleration of the engine cannot possibly result in overspeeding of clutch assembly 40 relative to gear 36 and that an acceleration will merely result in the shift assembly moving back to the low speed drive condition, illustrated in Figure 5.

It will readily be understood from the foregoing detailed description of construction and operation that stop members 220 and 222 determine the limits of diaphragm movement for powered driving engagement of the respective clutch teeth and permit springs 128 and 192 to effect the resilient engagement of the clutch teeth.

It will readily be seen from the foregoing description that there is herein provided an improved multi-speed vehicle drive axle wherein shifting from one drive condition to another is attained with maximum ease and smoothness and with a high degree of response to shifting operations of an improved novel clutch assembly. It will also be seen from the foregoing description of the novel construction of the high and low speed gears and associated press fittedly mounted clutch members that there is herein provided a much more compact less expensive multi-speed vehicle drive axle than heretofore possible with prior art devices.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is.

1. In a vehicle drive mechanism, a pair of complementarily toothed positively engageable clutch members the adjacent ends of the teeth of which are adapted for unidirectional ratcheting engagement prior to synchronization of the rotary speeds of said members during relative clutch engaging movement therebetween, a fluid motor actuated shift rail mounted shifting fork embracing one of said clutch members, means forming a resilient connection between said fork and one clutch member to impart movement thereto in a clutch engaging direction, and means forming a positive drive connection between said fork and one clutch member to impart movement thereto in a clutch disengaging direction.

2. In combination, a shaft having an enlarged intermediate longitudinally splined portion, two gears freely journalled on said shaft at opposite sides of said splined portion and having hubs projecting toward each other, separate clutch rings structurally independent of said hubs rigidly secured to said hubs, a clutch collar surrounding and mounted to shift axially of said shaft, two clutch rings internally splined on said splined portion of the shaft, compression spring means biasing said two clutch rings toward opposite ends of said collar, and axially fixed stops within said collar for limiting separation of said two clutch rings by expansion of said compression spring means and for positive engagement with one of the other of said two clutch rings during a clutch shift operation.

3. In the combination defined in claim 2, at least one of said stops being a snap ring seated in an internal groove in said collar.

4. In the combination defined in claim 2, said clutch rings on the gears being press fitted upon said hubs.

5. In the combination defined in claim 2, said compression spring means being disposed between said rings.

References Cited in the file of this patent
UNITED STATES PATENTS

| Number | Name | Date |
|---|---|---|
| 400,293 | Brooks | Mar. 26, 1889 |
| 901,456 | Loitron | Oct. 20, 1908 |
| 1,225,144 | Land | May 8, 1917 |
| 1,424,790 | Wiles | Aug. 8, 1922 |
| 1,877,736 | Wagner | Sept. 13, 1932 |
| 2,402,343 | Price | June 18, 1946 |
| 2,655,042 | Almond | Oct. 13, 1953 |
| 2,657,585 | Williams et al. | Nov. 3, 1953 |
| 2,657,588 | Wilson et al. | Nov. 3, 1953 |